G. B. BACHMANN.
BOTTLE FILLING APPARATUS.
No. 83,904. Patented Nov. 10, 1868.
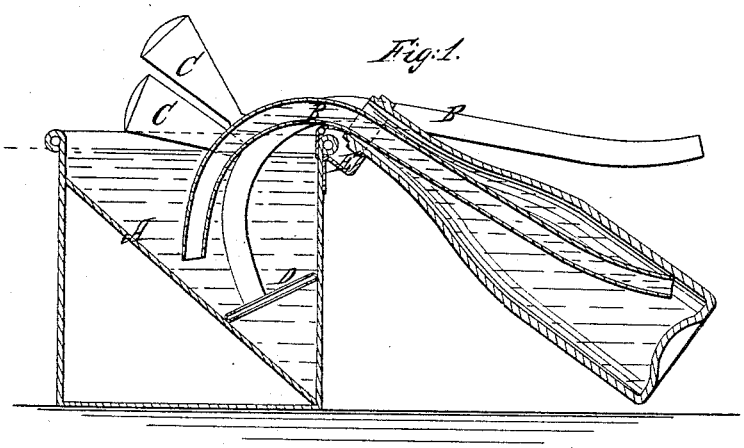
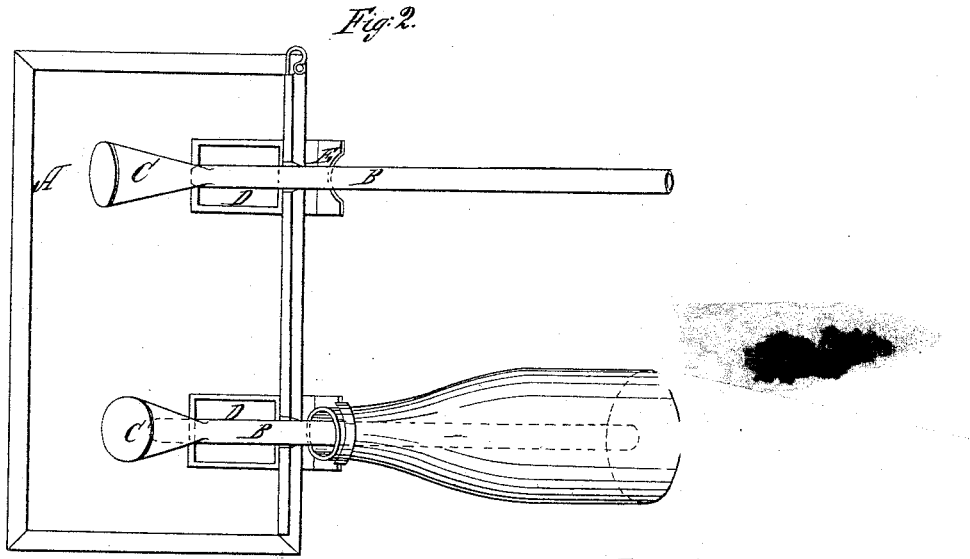
Witnesses:
E. F. Kastenhuber
Chas Wahlers
Inventor:
Gustavo B. Bachmann

GUSTAV BERNARD BACHMANN, OF BROOKLYN, E. D. NEW YORK.

Letters Patent No. 83,904, dated November 10, 1868.

IMPROVEMENT IN BOTTLE-FILLING APPARATUS.

The Schedule referred to in these Letters Patent and making part of the same.

*To all whom it may concern:*

Be it known that I, GUSTAV BERNARD BACHMANN, of Brooklyn, E. D., in the county of Kings, State of New York, have invented a new and improved Bottle-Filler; and I do hereby declare the following to be a full, clear, and exact description thereof, which will enable those skilled in the art to make and use the same, reference being had to the accompanying drawing, forming part of this specification, in which drawing—

Figure 1 represents a transverse section of this invention.

Figure 2 is a plan or top view thereof.

Similar letters indicate corresponding parts.

This invention consists in the arrangement of a siphon, attached, by a hinge-joint, to the edge of a reservoir, and loaded with a weight, which presses the short or inner leg of the siphon down upon a seat in the interior of the reservoir, in such a manner that, when said reservoir is filled with wine, beer, or other liquid, and the siphon is once started, the liquid will discharge through said siphon, into a bottle suspended from the long leg thereof, the weight of the bottle serving to raise the inner end of the siphon from its seat, and to depress the outer end thereof below the level of the liquid in the reservoir.

Under the long leg of the siphon is a supporting-bracket, cut out to fit the necks of the bottles to be filled, and placed in such a position that the mouth of a bottle suspended from the bracket is held above the level of the liquid in the reservoir, and the discharge of the liquid through the siphon into the bottle will stop automatically, when said bottle is filled to the desired point.

A represents a reservoir, made of tinned sheet-iron or any other suitable material, in any suitable form or shape, and of sufficient weight to be capable of supporting two or more bottles suspended from its edge, without being tipped over.

To the edge of this reservoir are hinged one or more siphons, B B, two being shown in the drawing; but, if desired, the number might be still further increased. The inner short legs of these siphons are curved down, and they are loaded by weights, C C, so that the same, when left to follow their inherent gravity, will bear down upon seats, D D, secured in the interior of the reservoir A. These seats are covered with leather, felt, or other suitable material, and the ends of the siphons are cut off in such a manner that the same, when allowed to bear down upon said seats, will be closed, and the flow of the liquid from the reservoir into the siphon will be stopped.

The outer or long legs of the siphons extend some distance beyond the edge of the reservoir, and they are curved up, so that when the siphons are left to follow their inherent gravity, their outer ends are elevated above the level of the liquid in the reservoir, and at the same time the liquid contained in the long legs of the siphons is prevented from flowing out.

Under the long leg of each siphon, and attached to the outside of the reservoir, is secured a bracket, E, the edge of which is cut out, so that the same will embrace and fit the necks of the bottles to be filled.

After the siphons have been started or filled with liquid, the bottles to be filled are placed on the long legs of the siphons, and these necks are hooked on the brackets E, as shown in red outlines in fig. 1; and by the weight of the bottle itself the siphon is depressed, and the liquid flows into the bottle, filling the same, until the level of the liquid in the bottle is equal to the level of the liquid in the reservoir.

At that point the discharge of liquid through the siphons stops; and if the bottle is removed, the siphon reassumes its original position, throwing its inner end down upon its seat, and its outer end above the level of the liquid in the reservoir, so as to stop the discharge of the liquid, while at the same time, by the curved shape of the long legs of the siphons, the liquid is retained therein, so that each siphon will commence to discharge as soon as its outer leg is depressed.

By these means the operation of filling wine, beer, or other liquid, from a barrel into bottles, is materially facilitated. The reservoir is placed under the faucet of the barrel, and the bottles are successively applied to the siphons. The liquid running into the reservoir from the barrel is thus continually drawn off; the faucet of the barrel can be left open until the barrel is empty, and the bottles are all filled to the required point, without danger of spilling any portions of the liquid.

Having thus described my invention,

What I claim as new, and desire to secure by Letters Patent, is—

1. The arrangement of one or more hinged siphons, B, loaded by weights C, in combination with the brackets E and reservoir A, substantially as and for the purpose described.

2. The seats D, in combination with the hinged siphons B B, and reservoir A, substantially as and for the purpose set forth.

GUSTAV BERNARD BACHMANN.

Witnesses:
W. HAUFF,
E. F. KASTENHUBER.